United States Patent [19]
Vaswani et al.

[11] Patent Number: 6,008,796
[45] Date of Patent: Dec. 28, 1999

[54] SOFTWARE-BASED DITHERING METHOD AND APPARATUS USING RAMP PROBABILITY LOGIC

[75] Inventors: Gautam Vaswani, Austin; Daniel P. Wilde, Cedar Park; Thomas Dye, Austin, all of Tex.

[73] Assignee: S3 Incorporated, Santa Clara, Calif.

[21] Appl. No.: 08/856,546

[22] Filed: May 15, 1997

Related U.S. Application Data

[63] Continuation-in-part of application No. 08/777,557, Dec. 30, 1996.

[51] Int. Cl.$^6$ .................................................... G09G 5/04
[52] U.S. Cl. ........................................... 345/155; 382/166
[58] Field of Search ................................. 345/147, 149, 345/153, 155, 431; 358/457; 382/166

[56] References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,956,638 | 9/1990 | Larky et al. | 340/701 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,185,602 | 2/1993 | Bassetti, Jr. et al. | 340/793 |
| 5,187,754 | 2/1993 | Currin et al. | 382/54 |
| 5,191,642 | 3/1993 | Quick et al. | 395/127 |
| 5,201,030 | 4/1993 | Carrie | 395/132 |
| 5,268,996 | 12/1993 | Steiner et al. | 395/126 |
| 5,293,467 | 3/1994 | Buchner et al. | 395/122 |
| 5,298,915 | 3/1994 | Bassetti, Jr. | 345/149 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,424,755 | 6/1995 | Lucas et al. | 345/155 |
| 5,469,190 | 11/1995 | Masterson | 345/155 |
| 5,553,200 | 9/1996 | Accad | 395/109 |

FOREIGN PATENT DOCUMENTS 9636011  11/1996  WIPO .

*Primary Examiner*—Mark R. Powell
*Assistant Examiner*—Thu Nguyen
*Attorney, Agent, or Firm*—Fenwick & West LLP

[57] ABSTRACT

An improved method and apparatus for rendering curved surfaces in a graphics system. The appearance of a curved surface is created by varying color shades across an object. The graphics systems represents each primary color with fewer than eight bits. The present invention maintains smooth transaction between color shades despite using fewer than eight bits to represent color. An eight bit color shade value is truncated, with the most significant bits being saved and used as a color value. The least significant bits that are truncated are used to determine which of the adjacent color values to use to render pixels. Thus, if five bits are saved and used to represent a color, the three least significant truncated bits are used to determine the appropriate mix of the closest five bit shades. The three truncated bits are used to select an entry from a ramp table and a control signal from a look-up table selects a bit from the selected ramp table entry. The selected bit is used to determine which of the closest five bit shades to use for rendering a pixel. The invention may be implemented in software.

49 Claims, 7 Drawing Sheets

|   |     | 8 BIT |   |   |   |   |   |   |   | 5 BIT |   |   |   |   |
|---|-----|---|---|---|---|---|---|---|---|---|---|---|---|---|
|   |     | 7 | 6 | 5 | 4 | 3 | 2 | 1 | 0 | 4 | 3 | 2 | 1 | 0 |
|   |     | 0 | 0 | 0 | 0 | 0 | 0 | 0 | 0 | 0 | 0 | 0 | 0 | 0 |
|   | 1/8 | 0 | 0 | 0 | 0 | 0 | 0 | 0 | 1 | 0 | 0 | 0 | 0 | 0 |
|   | 2/8 | 0 | 0 | 0 | 0 | 0 | 0 | 1 | 0 | 0 | 0 | 0 | 0 | 0 |
|   | 3/8 | 0 | 0 | 0 | 0 | 0 | 0 | 1 | 1 | 0 | 0 | 0 | 0 | 0 |
| A | 4/8 | 0 | 0 | 0 | 0 | 0 | 1 | 0 | 0 | 0 | 0 | 0 | 0 | 0 |
|   | 5/8 | 0 | 0 | 0 | 0 | 0 | 1 | 0 | 1 | 0 | 0 | 0 | 0 | 0 |
|   | 6/8 | 0 | 0 | 0 | 0 | 0 | 1 | 1 | 0 | 0 | 0 | 0 | 0 | 0 |
|   | 7/8 | 0 | 0 | 0 | 0 | 0 | 1 | 1 | 1 | 0 | 0 | 0 | 0 | 0 |
|   |     | 0 | 0 | 0 | 0 | 1 | 0 | 0 | 0 | 0 | 0 | 0 | 0 | 1 |
|   | 1/8 | 0 | 0 | 0 | 0 | 1 | 0 | 0 | 1 | 0 | 0 | 0 | 0 | 1 |
|   | 2/8 | 0 | 0 | 0 | 0 | 1 | 0 | 1 | 0 | 0 | 0 | 0 | 0 | 1 |
|   | 3/8 | 0 | 0 | 0 | 0 | 1 | 0 | 1 | 1 | 0 | 0 | 0 | 0 | 1 |
| A | 4/8 | 0 | 0 | 0 | 0 | 1 | 1 | 0 | 0 | 0 | 0 | 0 | 0 | 1 |
|   | 5/8 | 0 | 0 | 0 | 0 | 1 | 1 | 0 | 1 | 0 | 0 | 0 | 0 | 1 |
|   | 6/8 | 0 | 0 | 0 | 0 | 1 | 1 | 1 | 0 | 0 | 0 | 0 | 0 | 1 |
|   | 7/8 | 0 | 0 | 0 | 0 | 1 | 1 | 1 | 1 | 0 | 0 | 0 | 0 | 1 |
|   |     | 0 | 0 | 0 | 1 | 0 | 0 | 0 | 0 | 0 | 0 | 0 | 1 | 0 |
|   | 1/8 | 0 | 0 | 0 | 1 | 0 | 0 | 0 | 1 | 0 | 0 | 0 | 1 | 0 |

X Addr

| | 0 | 1 | 2 | 3 | 4 | 5 | 6 | 7 |
|---|---|---|---|---|---|---|---|---|
| 0 | 0 | 4 | 1 | 5 | 0 | 4 | 1 | 5 |
| 1 | 6 | 2 | 7 | 3 | 6 | 2 | 7 | 3 |
| 2 | 1 | 5 | 0 | 4 | 1 | 5 | 0 | 4 |
| 3 | 7 | 3 | 6 | 2 | 7 | 3 | 6 | 2 |
| 4 | 0 | 4 | 1 | 5 | 0 | 4 | 1 | 5 |
| 5 | 6 | 2 | 7 | 3 | 6 | 2 | 7 | 3 |
| 6 | 1 | 5 | 0 | 4 | 1 | 5 | 0 | 4 |
| 7 | 7 | 3 | 6 | 2 | 7 | 3 | 6 | 2 |

Y Addr

Figure 4

RAMP ( 5 Bit System)
Bit #

| FRAC | 7 | 6 | 5 | 4 | 3 | 2 | 1 | 0 |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 1 | 1 | 0 | 0 | 0 | 0 | 0 | 0 |
| 3 | 1 | 1 | 1 | 0 | 0 | 0 | 0 | 0 |
| 4 | 1 | 1 | 1 | 1 | 0 | 0 | 0 | 0 |
| 5 | 1 | 1 | 1 | 1 | 1 | 0 | 0 | 0 |
| 6 | 1 | 1 | (1) | 1 | 1 | 1 | 0 | 0 |
| 7 | 1 | 1 | 1 | 1 | 1 | 1 | 1 | 0 |

Figure 5

RAMP ( 6 Bit System)
Bit #

| FRAC | 3 | 2 | 1 | 0 |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 1 | 1 | 0 |

Figure 6

SOFTWARE-BASED DITHERING METHOD AND APPARATUS USING RAMP PROBABILITY LOGIC

CROSS-REFERENCE TO RELATED APPLICATIONS

This application is a continuation-in-part of Ser. No. 08/777,557 filed Dec. 30, 1996.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphic system for a personal computer. More particularly, the present invention relates to rendering polygons on a computer screen. Still more particularly, the present invention relates to a technique for dithering polygons to create curved surfaces.

B. Background of the Invention

Before the availability of the personal computer (PC), computer graphics packages were expensive tools primarily reserved for industrial applications. Early microcomputers were only capable of rendering simple line drawings with a low screen resolution (256×256, for example). As microcomputers evolved, higher resolution color displays became available, and software applications routinely provided data output in a graphical format. The graphics techniques used were unstructured, with objects defined in terms of absolute coordinates using straight lines. Subsequently, graphics "primitives" were developed, enabling circles, ellipses, rectangles and polygons to be drawn with single software instructions. The use of primitives for drawing shapes increased the speed at which the images can be rendered.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. A set of vertex points defines a polygon. Associated with each point are certain parameters, such as shading, texturing, color, and the like. Identification of other non-vertex points within the polygon typically is done through the use of linear interpolation. Once interpolated, the polygon can be rendered on a computer monitor by successive scanning of successive rows of the polygon.

Demand for higher performance computer graphics has led to graphics systems capable of much greater speed, resolution, and quality than graphics systems of only a few years ago. Traditionally, graphic systems employed an "8-8-8" standard, and many still do, in which eight bits are used to represent each of the three primary colors red, green, and blue. That is, eight bits are used for red, eight bits for green, and eight bits for blue. In an 8-8-8 system, therefore, twenty-four bits are needed to fully represent the color of a single pixel. Using eight bits for each color allows 256 different shades of each of the three primary colors. To increase the resolution of the color system, each color is represented with an "8.16" interpolator value in which sixteen bits of FRACtional color are included with each eight bit integer shade. With such resolution 8-8-8 graphics systems typically produce very high quality color images.

The down side of an 8-8-8 graphics system is that twenty-four bits are necessary to represent the integer color shade of a single pixel. The number of pixels on a typical computer screen today commonly approaches 1,000,000. With twenty-four bits of color and other parameters associated with each pixel, voluminous bits of information necessarily must be processed, thereby creating a demand for higher memory capacity and faster processing. Semiconductor part manufacturers have responded by developing higher performance graphics hardware. In many graphics applications, however, there is a demand for even higher performance from computer hardware.

Designers of graphics systems, therefore, have developed various techniques to achieve greater performance given the performance limitations of the supporting graphics hardware. For example, other graphics standards exist besides the 8-8-8 standard. One such standard is the "5-6-5" system in which five bits are used to represent shades of red, six bits are used to represent green, and five bits are used for blue. As shown in FIG. 1, in an eight bit system, eight bits are used to represent the color red. In a 5-6-5 system, however, only the upper or most significant five bits, i.e., bits $R_3-R_7$, are used for red. The least significant three bits, $R_0-R_2$, are simply truncated and not used. For the color green the upper six bits are used, i.e., $G_2-G_7$, with bits $G_0$ and $G_1$ truncated. An extra bit is used for the color green because most human eyes are more sensitive to the color green and thus, additional resolution or precision for the color green is needed. The sixteen color bits that are used (five each for red and blue and six for green) are packed together for storage and/or processing. Other standards such as the "5-5-5" and "3-3-2" standards are also used.

Using a 5-6-5 system, instead of 8-8-8, advantageously allows the integer portions of the color representation to be stored in sixteen bits (i.e., two bytes) of memory instead of twenty-four bits (three bytes) as necessary for an 8-8-8 system. Moreover, significantly less memory is necessary to store computer images with a 5-6-5 system and more graphics information can be processed faster using existing hardware devices.

As one of ordinary skill in the art will recognize, representing a color shade with eight bits allows $2^8$ or 256 different integer shades of that color. Representing a color shade with only five bits, however, allows for just $2^5$ or 32 shades of that color and using six bits allows for 64 (26) color shades. Referring now to FIG. 2, a comparison between an eight bit color standard and a five bit standard emphasizes the lower precision of a five bit system. Because the least significant three bits (bits 0–2) are truncated from an eight bit shade to create the five bit shade, eight bit color shades 0000 0000 through 0000 0111 (decimal 0–7) are represented by 00000 in the five bit system. In other words, with only five bits, the five bit representation cannot distinguish between eight bit shades 0–7 (decimal). Similarly, eight bit color shades 0000 1000 through 0000 1111 (decimal 8–15) are represented by 00001 in the five bit standard. This comparison illustrates that for every increment (or decrement) in a five bit color shade, eight eight-bit color shades are skipped. A similar comparison could be made for the six bit representation for the color green highlighting that because only the least significant two bits are truncated, there are four eight-bit green color shades for every six bit shade.

Polygons typically are drawn one row of pixels at a time, rendering pixels individually from one edge of the polygon to the other. To give the appearance of a curved surface to create 3-D images, a graphics system applies varying shades of color to the pixels rendered. For example, a polygon might be rendered with a dull shade of red on the left side of the polygon and bright red on the right side with a transition between the dull and bright shades for the intervening pixels. In an 8-8-8 system, with 256 integer shades each for red, green, and blue and sixteen bits of FRACtional shades, there is sufficient color precision to make the transitions of color across a polygon appear smooth to the human eye.

The attendant lower precision in a 5-6-5 graphics system does not permit color transitions across a polygon that are as smooth as in 8-8-8 systems. This problem is called "banding." Banding is caused by color transitions across polygons that include more pronounced, larger increments in shades of color because there are fewer different shades possible than in an 8-8-8 system. The boundary lines between different shades is more perceptible to the eye. A polygon rendered using the 5-6-5 color standard appears as bands of different shades of color on the computer screen rather than smooth transitions. Transitions in color shades in a 5-6-5 system between bands is noticeable despite the difference between adjacent bands of only a single shade of color.

To minimize the undesirable appearance of an image suffering from banding, the technique of dithering is used. Dithering takes advantage of the insufficient resolving ability of the human eye to distinguish individual pixels from a large group of pixels on a computer screen. Dithering allows the appearance of a color band to be altered to make the color shade of the band appear closer to the shade of an adjacent band, thereby smoothing the sharp transitions between the two bands. Graphics systems implementing known dithering techniques increment by one binary value randomly selected pixels in a band. Thus, some pixels in the dithered band are rendered using one shade of color, while other randomly selected pixels in the band are rendered using the color shade of the pixels in the adjacent band. The appearance of the dithered band thus appears closer to the shade of the adjacent band and the transition in color shades between the two bands is less noticeable to the eye. For the colors red and blue in a 5-6-5 system, incrementing a color shade by one shade level is equivalent to an increment of eight color shades in an eight bit system as demonstrated in FIG. 2. For the color green, a unitary increment equates to an increment of four shades of green in an eight bit system.

Although images using the dithering technique appear to lose the undesirable sharp edges between color bands, the result is still less than completely satisfactory because the dithered image is not an accurate rendition of the desired color transitions across the polygon. Because pixels are rendered randomly using one of two shades of color, the appearance to the eye of the band changes, but the resulting appearance is not necessarily the desired shade. Referring to FIG. 2, for example, if the desired eight bit red color shade in a particular region of a polygon is 0000 0010, commonly known dithering techniques will randomly render the pixels in that region with five bit shades 00000 and 00001. If, however, eight bit shade 0000 0111 were desired, systems implementing dithering will also randomly render the same group of pixels with five bit shades 00000 and 00001. The appearance to the eye will be the same because the same five bit shades (00000 and 00001) would be used in random fashion in both instances.

Thus, it would be desirable to provide a computer graphics system that solves the banding problem associated with graphics systems that represent color with fewer than eight bits of precision. In particular, it would be desirable to provide a graphics system in which fewer than eight bits are used to represent shades of color that can achieve the color precision of eight bit systems. Despite the advantages of such a system, to date, no such system has been developed.

BRIEF SUMMARY OF THE INVENTION

A method and apparatus is disclosed for an improved technique to create the appearance of curved surfaces in a graphics system. The appearance of a curved surface is created by varying color shades from one edge of the surface to the other edge. To create high quality curved surfaces, the color shade must be varied smoothly. The present invention preferably includes fewer than eight bits to represent shades of color. For example, five bits may be used for the colors red and blue and six bits may used for green. For sake of clarity, the disclosure of the invention assumes five bit color shade values. The five bit color shade values are derived from eight bit shade values by truncating the lower three bits of the eight bit shade values. Five bit color shade representations, although requiring less memory to store the shade values, provide less precision than eight bit shade values. Because fewer shades of color are possible with five bit systems, compared to eight bit systems, color "bands" are noticeable on the computer screen and detract from the appearance of the graphics images. The present invention overcomes the problem of lower precision by blending five bit shade values appropriately to create the appearance of a color shade representable otherwise only by an eight bit color shade value.

The appropriate blend of five bit color shade values is determined from the three bits that are truncated from the eight bit shade values to create the five bit shade values. The three truncated bits are referred to as the FRAC. The FRAC provides an indication of the color resolution that is lost when the FRAC bits are truncated to create the five bit shade values. The present invention allows for control of the blend of five bit color shade values to create the appearance of an eight bit color shade that could otherwise only be displayed in a graphics system that uses eight bits to represent color. The FRAC is used to control the blend of five bit color shade values. Thus, smooth color transitions can be made across a surface to create high quality curved surfaces and avoid banding problems associated with five and six bit systems.

BRIEF DESCRIPTION OF THE DRAWINGS

For a detailed description of the preferred embodiments of the invention, reference will now be made to the accompanying drawings wherein:

FIG. 2 depicts the reduction in resolution which results in a five bit system as compared to an eight bit system;

FIG. 4 shows a look-up table constructed in accordance with the preferred embodiment;

FIG. 5 shows a ramp table for the colors red and blue constructed in accordance with the preferred embodiment;

FIG. 6 shows a ramp table for the color green constructed in accordance with the preferred embodiment;

DETAILED DESCRIPTION OF THE INVENTION

Figure 3:
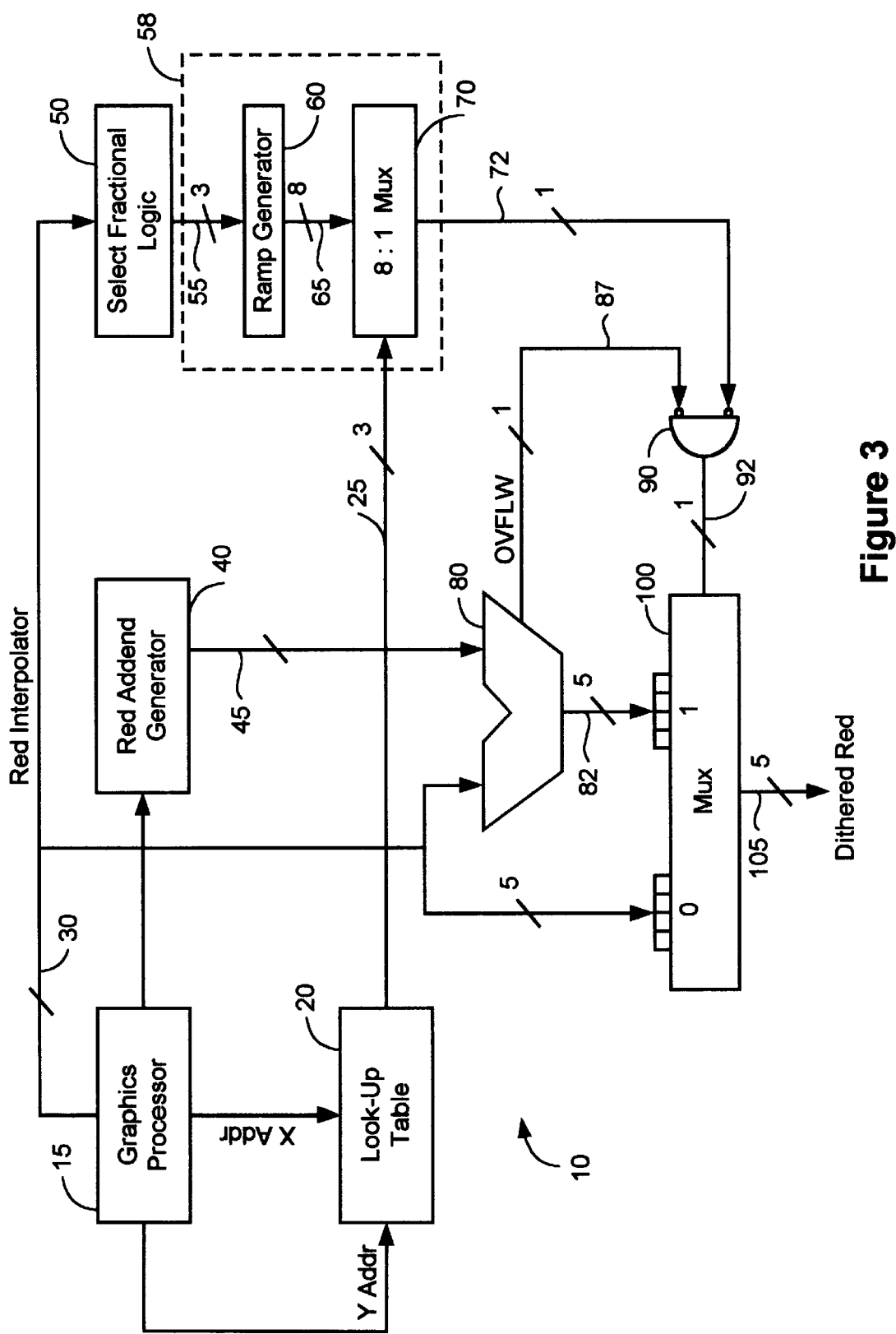
FIG. 3 shows a block diagram of the dither system constructed in accordance with the present invention.

Referring now to FIG. 3, a dither system 10 constructed in accordance with the preferred embodiment is shown for dithering color in a five bit color system. It is recognized, however, that the invention could easily be adapted to a system using a different number of bits for representing color known by those of ordinary skill in the art upon reading the following disclosure. Thus, the present invention is intended to be operable with 5-6-5 and 3-3-2 color standards and the like.

FIG. 3 is directed to a portion of a dither system for controlling dithering of the color red. One skilled in the art will understand that similar portions are used for the colors green and blue modified as needed depending on the number of bits used to represent green and blue color shades. Dither system 10 preferably includes a graphics processor 15, a look-up table 20, red addend generator 40, select FRACtional logic 50, dither probability logic 58, add logic 80, AND gate 90, and multiplexer 100. The graphics processor 15 includes commonly known processors such as the CL-GD546X Visual Media™ Accelerator family of processors (manufactured by Cirrus Logic), and the like. Although shown as a physically separate component in FIG. 3, graphics processor 15 may include some or all of the other components shown. Graphics processor 15 preferably couples to a central processing core (not shown) and controls the rendering of images provided by the central processing core. The graphics processor 15 provides x and y addresses to the look-up table 20. Graphics controller 15 also provides a Red Interpolator signal on lines 30 to select fractional logic 50, add logic 80, and multiplexer 100. In addition, the graphics processor 15 provides a control signal to red addend generator 40.

Dither probability logic 58 includes a ramp generator 60 coupled to a multiplexer 70 via lines 65. Select fractional logic 50 provides input signals to ramp generator 60 over data lines 55. Look-up table 20 provides control signals to multiplexer 70 over data lines 25. As shown in FIG. 3 and explained in greater detail below, multiplexer 70 is an 8:1 multiplexer in which one of eight input signals is selected to be the output signal in accordance with the state of the control signals provided by look-up table 20.

The inputs to the add logic 80 and select fractional logic 50 include a red interpolator signal on lines 30 from graphics processor 15. Inputs to add logic 80 also include the output of red addend generator 40 over lines 45. The output of the add logic 80 couples to the "1" input of multiplexer 100 on lines 82. An overflow output signal (OVFLW) from add logic 80 on line 87 and the output signal of multiplexer 70 on line 72 are provided as input signals to AND gate 90. The input of AND gate 90 that receives the OVFLW signal preferably is an inverting input, but may be non-inverting depending on the active state of the OVFLW signal as described below. The red interpolator signal also is provided to the "0" input of multiplexer 100. The red interpolator signal preferably follows the 8.16 format. The output of the dither system 10 preferably is provided as the dithered red signal on line 105 which is the output of multiplexer 100.

The dither system 10 in FIG. 3 illustrates generating a dithered signal for the color red, but similar architecture is used for dithering the colors blue and green. If a 5-6-5 color standard is implemented, the architecture for blue is substantially identical to that shown in FIG. 3 because five bits are used for both red and blue in the 5-6-5 standard. Because six bits are used for green in the 5-6-5 format, some architectural differences result for dithering green. The present invention can be readily adapted to any color standard, as would be known by one ordinary skill in the art. Specific differences between the five bit dither system depicted in the drawings herein and six bit systems are identified throughout the following discussion as examples of how the invention can be adapted to graphics systems that represent color shades with more or less than five bits.

Referring now to FIG. 4, look-up table 20 preferably comprises an 8×8 array of three bit numbers that are used for dithering the colors red and blue. The table entries are in the range of 000 to 111. For convenience the entries in the look-up table are shown in decimal form with the understanding that three bits are used to represent those values in binary form. The 64 three-bit values in the look-up table 20 may include many different combinations of three bit values, but the combination shown in FIG. 4 is preferred. Each pixel on the screen is identified by an x address and a y address preferably provided by graphics processor 15 (FIG. 3). Inputs to the look-up table 20 include the x and y addresses of the pixel to be rendered (i.e., colored). Because there are only eight columns and eight rows in the look-up table, only three bits are needed from the x address and y address to access all of the columns and rows, respectively. Preferably, only the least significant three bits of the x and y addresses are used to access the look-up table, although other combinations of three bits from the addresses could be used. Thus, if the least significant three bits of the x address are "101" (decimal 5) and the least significant three bits of the y address are "010" (decimal 2), the selected look-up table value will be "5." Look-up table 20 preferably is implemented in some type of random access memory (RAM) or hardware configuration registers, as will be apparent to one of ordinary skill in the art. For the color green, the look-up table 20 shown in FIG. 4 may be used. Alternatively, look-up tables with only two bit values may be used.

Referring again to FIG. 3, red addend generator 40 includes logic circuitry known to those of ordinary skill in the art for selecting an appropriate addend value which when added to a current eight bit shade of color results in an increment of color shade in a five bit representation following the truncation of the lower three bits. As can be seen with reference to FIG. 1, to increment one five bit color shade for red and blue, a binary value of 1000 (decimal 8) must be added to an eight bit shade. Similarly, incrementing from one six bit green shade to the next higher shade requires adding a binary 100 (decimal) value to the eight bit shade because only the least significant two bits are truncated for green in the 5-6-5 system. After the appropriate addend value is added to the eight bit red shade represented by the Red Interpolator signal, the lower three bits are truncated with the resulting five bit red color shade representation being one five bit shade higher than it would have been had the truncation occurred without the addition of the addend value. The addend generator 40 generates the appropriate addend value on lines 45 and provides that value to add logic 80. The addend generator 40 in FIG. 3 is shown as for the color red. Additional addend generators can be provided for green and blue. Alternatively, one addend generator could be implemented that provides addend values for all three colors. The code in the Appendix includes exemplary logic equations for generating the addend values.

Add logic 80 adds the eight bit red integer interpolator value provided by processor 15 to the addend value received from red addend generator 40 and provides the sum to multiplexer 100 on output lines 82. The output lines 82 preferably include the upper five bits of the eight bit output value of add logic 80. By selecting only the upper five bits, the lower three bits are truncated. To dither the color green, the upper six bits of the add logic 80 output signal are used, thus truncating the least significant two bits.

Add logic 80 also preferably includes an overflow signal (OVFLW) on line 87. The OVFLW signal is a single bit value that indicates the existence of an overflow condition when adding binary values, the result of which requires an extra bit. Two eight bit values may be added, for example, and the result is a nine bit value. The additional ninth bit is referred to as the overflow bit. The OVFLW bit typically is a logic "1" to indicate an overflow condition or a "0" to indicate the absence of an overflow condition. Alternatively, a "0" might be used to indicate an overflow and a "1" might indicate the absence of an overflow. If the add logic 80 provides an OVFLW bit with the alternative protocol, the inverting input to AND gate 90 that receives the OVLFW bit should be replaced with a non-inverting input.

Figure 1:
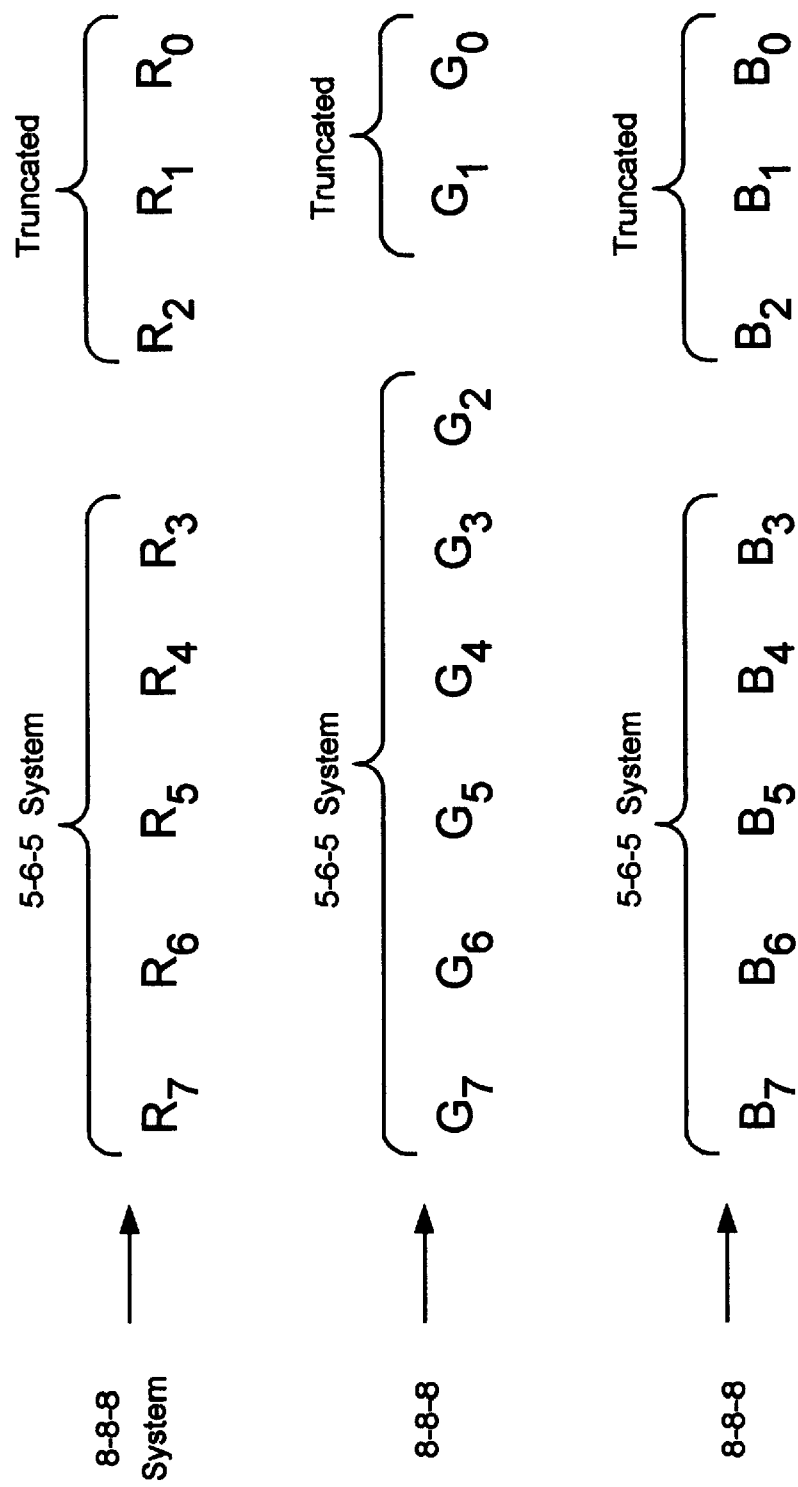
FIG. 1 shows truncation of integer bits in a 5-6-5 graphics system.

Select fractional logical 50 receives the red interpolator signal on line 30 from the graphics processor 15 and produces on its output lines 55 the three least significant bits of the eight bit integer shade (FIG. 1). For dithering the color green, the two least significant bits are included on lines 55 by the select fractional logic 50. The values selected and output by the select fractional logic 50 are referred to as the fractional value or simply FRAC.

Ramp generator 60 receives the FRAC values from the select fractional logic 50 and includes logic for generating a multi-bit output value based upon the value of the FRAC. The multi-bit output value is selected from a ramp table. Referring now to FIG. 5, an exemplary ramp table 61 comprises eight eight-bit ramp values. Table 61 preferably is used for dithering the colors red and blue in a 5-6-5 system. An eight bit ramp value is associated with each three bit FRAC value. As shown, a binary ramp value of 0000 0000 is associated with FRAC value 0, a ramp value 1000 0000 is associated with FRAC value 1, and a ramp value 1100 0000 is associated with FRAC value 2. Additionally, ramp value 1110 0000 is associated with FRAC value 3, ramp value 1111 0000 is associated with FRAC value 4, and ramp value 1111 1000 is associated with FRAC value 5. Finally, a ramp value of 1111 1100 is associated with FRAC value 6 and a ramp value of 1111 1110 is associated with FRAC value 7. The term "ramp" reflects the upward sloping appearance of table 61 indicated by line 62 separating the binary 1 values from the binary 0 values.

Referring to FIG. 6, a ramp table 64 is shown for use in systems that use six bits to represent color. Table 64 is shown comprising four ramp values associated with four FRAC values. Each ramp value for the color green comprises a four bit binary value. As shown, ramp value 0000 is associated with FRAC value 0, and ramp value 1000 is associated with FRAC value 1. Finally, ramp value 1100 is associated with FRAC value 2 and ramp value 1110 is associated with FRAC value 3.

The ramp tables 61, 64 shown in FIGS. 5 and 6 reflect the preferred embodiment of the invention. It should be noted, however, that ramp tables with different binary number combinations are possible and are also consistent with the preferred embodiment. Such other tables will become apparent to one of ordinary skill in the art upon reading this disclosure and thus are not shown explicitly herein.

As mentioned previously, multiplexer 70 preferably includes a commonly known 8:1 multiplexer including eight input signals on lines 65 and one output signal on line 72. One of the eight input signals from ramp generator 60 is selected by the multiplexer to be the output signal. The three bits on lines 25 generated by the look-up table 20 are used as control lines for multiplexer 70. The control bits determine which input signals the multiplexer should select. The multiplexer 70 decodes the control bits and switches or latches the input specified by the control bits to the output line. For example, if the bits on lines 25 include a 101 binary value (decimal 5), the fifth bit of the eight bit ramp value provided on lines 65 is selected and provided as the output signal on line 72. Thus, for a FRAC value of 6 and control bits on lines 25 of decimal 5, the bit circled in FIG. 5 ("1") would be selected by multiplexer 70.

For six bit color systems, the ramp values preferably include four bits as discussed above with reference to FIG. 6. In a six bit system, the multiplexer 70 comprises a 4:1 multiplexer. Because a 4:1 multiplexer includes four input signals, only two control bits are needed from the look-up table as would be apparent to one skilled in the art. Two of the three output bits from look-up table 20 may be used (for example, the lower three bits) or the look-up table may be configured to include only two bit values as discussed previously.

Multiplexer 100 preferably includes two sets of input terminals, labeled "0" and "1" in FIG. 3. Each set of input terminals includes five terminals. If a multiplexer is used that includes more than five input pins for each set of inputs, preferably only five of the terminals are implemented in the design for the purpose of dithering. The control signal for multiplexer 100 is provided from the output of AND gate 90 via line 92. A logic "0" control signal preferably directs the multiplexer 100 to select the "0" set of input lines and a logic "1" selects the "1" set of input lines. Alternatively, a "1" control bit might be used to select the "0" inputs and a "0" control bit might select the "1" inputs. The following discussion assumes the former protocol, that is, logic 0 control bit selecting "0" inputs and logic 1 control bit selecting "1" inputs. Whichever set of input bits ("0" or "1") is selected by the control bit, those selected bits are provided as the output signals of the multiplexer 100 on lines 105. The output bits on lines 105 represent the dithered red signal and are used to direct the operation of the red gun common to video monitors to render the appropriate dithered shade of red. The physical operation of the color guns in a cathode ray tube display are known to those of ordinary skill in the art and thus are not specifically discussed in this disclosure.

For the color green in which six bits are used to represent the integer shade of green, multiplexer 100 includes two sets of input signals with each set containing six signals. The "0" inputs include the upper six bits of the eight bit integer green shade value. The "1" inputs include the upper six bits of the output of the add logic 80 as discussed previously.

The principle upon which the present invention is based is described with reference to FIG. 7 which shows nine eight-bit color shade values from 0000 0000 to 0000 1000 (decimal 0–8). Eight bit color shades 0 and 8 are accurately representable in a five bit system. That is, eight bit shade 0 is exactly equivalent to five bit shade 0 and eight bit shade 8 is exactly equivalent to five bit shade 1. Exact matching of color shades in eight bit and five bit systems occurs for any eight bit shade in which the lower three bits include only zero values. Color shade values 0000 0001 through 0000 0111 (decimal 1–7) are not accurately representable in a five bit system because the lower three truncated bits in box 63 contain non-zero values. Truncating the least significant three bits from eight bit shade values 1 through 7 results in five bit shade value 00000 as shown in box 64. The conversion to a five bit shade results in a shade value (00000) that is not equivalent to any of eight bit shade values 1 through 7. The loss of accuracy results from the lower precision capability of a five bit versus an eight bit system.

The truncated bits 63, however, indicate the number of incremental shades between eight bit values that can be represented exactly by a five bit shade. For example eight bit color shade value 0000 0010 is two eight-bit integer color shades away from eight bit shade value 0000 0000 (which is equivalent to five bit shade 00000). Similarly, color shade value 0000 0111 is seven shades away from shade value 0000 0000. The truncated bits in box 63 provide a measure of the proximity, in terms of numbers of color shades, between the desired shade (0000 0010 and 0000 0111 in the examples above) and the nearest lower eight bit shade that is equivalent to a five bit shade.

Figure 7:
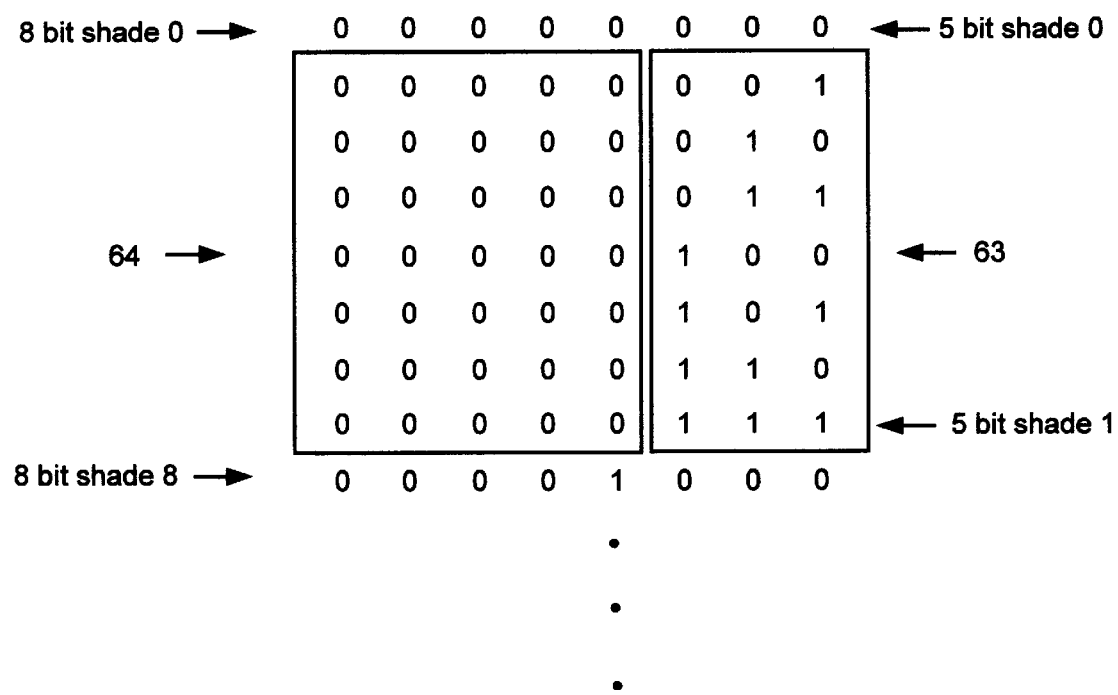
FIG. 7 is a table illustrating the benefit of using the truncated bits to select the ramp value.

Referring to FIGS. 3 and 7, the three truncated bits in box 63 represent the FRAC values and are produced by the select fractional logic 50. The present invention takes advantage of the fact that the three truncated bits, the FRAC value, provide an indication of the proximity of the desired eight bit color shade value to an eight bit shade value that is equivalent to a shade value in a five bit system. With the FRAC value, dither system 10 renders pixels in a given color band using an appropriate mix of the two five bit color shade values closest to the desired eight bit shade. The appropriate blend of the two closest five bit shade values is determined by the FRAC value. It has been experimentally shown that a group of pixels can be rendered with two color shades (some pixels in the group rendered with one shade and other pixels with the other shade) to produce what appears to the eye to be a different shade than either of the two shades used to render the pixels. The resulting apparent color shade, in fact, can be controlled by varying the mixture of the two shades; that is, controlling which pixels in the group are rendered with one shade and which pixels are rendered with the other shade.

With reference to FIG. 7, if for example, it is desired to render a portion of an image with the eight bit red color shade value 0000 0111 (decimal 7) in a five bit system, the pixels can be colored with five bit shade values 00000 and 00001; some of the pixels with shade value 00000 and other pixels with shade value 00001. If the mixture of shade values 00000 and 00001 is determined appropriately, the image will appear as eight bit shade 0000 0111. The bits truncated during the conversion of the eight bit integer shade value to a five bit value (the FRAC value) are used for controlling which pixels are rendered with five bit shade value 00000 and which pixels are rendered with shade value 00001.

If the desired eight bit shade value is 0000 0111 (decimal 7), the corresponding FRAC value is 111 indicating that the desired eight bit shade value is seven color shades from five bit shade value 00000. There are eight eight-bit shade values for every five bit shade value as shown best by reference A in FIG. 2. Thus, eight bit shade value 0000 0111 can be thought of as being ⅞ of the total number of eight bit shade values between 0000 0000 and 0000 1000. The appearance of eight bit shade value 0000 0111 in a group of pixels in a five bit system can be created by rendering ⅞ of all of the pixels in the group as five bit shade value 00001 and the remaining ⅛ of the pixels as five bit shade value 00000. The selection of pixels to be rendered as shade value 00000 or 00001 is not critical and preferably is substantially random, i.e., a randomly selected portion of the pixels in the group are rendered with shade value 00001. By way of a further example, eight bit shade value 0000 0010 has an associated FRAC of 010 (decimal 2) and thus, this eight bit shade value is ⅖ of the total number of eight bit color shade increments between shade values 0000 0000 and 0000 1000. Thus, ⅖ of the pixels in a group for which it is desired to appear as eight bit shade value 0000 0010 are rendered with five bit shade value 00001 and ⅗ of the pixels are rendered with shade value 00000. The left most column in the table in FIG. 2 indicates the fractions associated with each eight bit shade that does not have an equivalent five bit shade.

Referring to FIGS. 5 and 6, the proximity information from the FRAC values is encoded in the ramp values in tables 61, 64 through the number of logic 1 values. Thus, ramp value 1111 1110, associated with FRAC value 7, includes seven logic 1 bits. Similarly, ramp value 1000 0000 includes one logic 1 and is associated with FRAC value 1.

It will be apparent to one of ordinary skill in the art that because the number of logic one values in the ramp tables encodes the desired proximity information, any one ramp value need only include the proper number of logic 1 values; it is not important which bit positions contain the logic 1 and 0 values. Thus, ramp value 1000 0000, for example can be substituted with 0100 0000, 0010 0000, 0001 0000, 0000 1000, 00000100, 00000010, and 00000001.

Referring to FIG. 3, ramp generator 60 uses the FRAC value received on lines 55 to produce on its output lines 65 a corresponding eight bit ramp value per tables 61, 64. Multiplexer 70 receives the eight bit RAMP value from ramp generator 60 and the three bit value from look-up table 20. The three bit value from look-up table 20 is used to select one of the eight ramp bits on lines 65. The bit that is selected from the ramp value is provided on the multiplexer's output line 72. The probability that an output signal from multiplexer 70 will be a logic 1 depends on the number of logic 1's in the ramp value. If a 1111 1100 ramp value, for example, is provided to the multiplexer and one of those bits is randomly selected, the probability that the selected bit will be a logic 1 is ⅝ or 75% because six of the eight bits comprises a logic 1. However, if the ramp value was 1100 0000, the probability that the selected bit will be a logic 1 is ⅖ or 25%. As will be seen below, the probability that the output bit from multiplexer 70 is a logic 1 directly determines the mix of color shades for dithering.

As stated previously, the look-up table 20 provides the control bits to the multiplexer 70 and are used to select the output bit from the eight input ramp bits. The combination of three bit entries in look-up table 20 are not completely randomly selected values, but have been selected in accordance with the preferred embodiment because that combination has been shown experimentally to provide superior dither results to other three bit combinations.

Still referring to FIG. 3, the addend value from red addend generator 40 is added to the red interpolator integer value by add logic 80 and the most significant five bits are provided on the add logic's output lines 82. The output of the add logic 80 thus includes the five bit color shade that is one five bit shade higher than the five bit shade resulting from truncating the least significant three bits of the eight bit shade. The "0" input to multiplexer 100 includes the five bit shade resulting from truncating the lower three bits of the eight bit shade by add logic 80. The "1" input includes the shade on the "0" input incremented by one shade by add logic 80. Multiplexer 100 is used to select one of the two five bit shades for dithering. The output of AND gate 90 provides the control bit to select between the inputs of multiplexer 100.

With the OVFLW signal set to 0, indicating the absence of an overflow condition in add logic 80, the state of the output bit from multiplexer 70 dictates the state of the control line for multiplexer 100. If the output bit from multiplexer 70 is a logic 0, the output of AND gate 90 will be a logic 0 and the "0" input lines of multiplexer 100 will be selected for the output on lines 105. Conversely, if the output bit from multiplexer 70 is a logic 1, the output of AND gate 90 will be a logic 1 and the "1" input lines from multiplexer 70 will be selected for the output on lines 105.

The logic level of the output bit of multiplexer 70 on line 72 will be the same as the logic level of the control bit for multiplexer 100 and thus, the selection of the five bit shade on input "0" or the five bit shade on input "1" (which is one shade level higher than the shade on input "0") is directed by the output bit from multiplexer70. The probability that input "1" will be selected is the same as the probability that the output bit of multiplexer 70 will be a logic 1. It can thus be seen that the selection of inputs "0" and "1" follow the number of logic 1's in the ramp values. The resulting dithered red output signal on lines 105 provides the appropriate mix of five bit shades to create the appearance in a group of pixels of an eight bit shade that has no equivalent shade in a five bit system.

It is possible that the addition of the red interpolator value on lines 30 and the red addend generator 40 output on lines 45 creates an overflow condition as one of ordinary skill in the art will know. If the desired eight bit red color shade value is 1111 1111, for example, and 0001 0000 represents an appropriate red addend generator output value and is added to the desired eight bit color value by add logic 80, the result is 1 0000 1111. If only the upper five bits (not including the ninth overflow bit) of the output of add logic 80 are used, the resulting dithered red signal selected by multiplexer 100, with control line 92 at a logic 1 state, would be 00001. Generally, the lowest color shade value represents the dullest shade and the highest color shade value represents the brightest shade. Adding addend value 0001 0000 to eight bit color shade value 1111 1111 (bright red) to generate the next highest five bit shade creates, instead, five bit color shade 00001 (dull red).

The OVFLW bit is used to avoid rendering an erroneous color shade.

The overflow bit from add logic 80 is input into an inverting input of AND gate 90. If the OVFLW bit is a 1 indicating the presence of an overflow condition, the output of AND gate 90 will be a zero and thus, multiplexer 100 input "0" will be selected. Thus, for overflow conditions, the sum of the red addend generator output value and the eight bit interpolator value will not be selected as the dithered red output signal on line 105. Instead, the upper five bits of the eight bit interpolator value on input "0" of multiplexer 100 will always be selected during overflow conditions. The dithering function effectively is disabled during overflow situations. Disabling dithering during overflows is preferable to changing bright color shades to dull color shades, and vice versa.

The present invention may be implemented in either hardware or software or a combination of both. An exemplary software embodiment is shown by way of a source code listing in FIG. 8. The source code shown is merely one possible way to implement the present invention in software and thus the invention is not intended to be limited to any particular software implementation.

The functions performed by the software generally are four-fold: (1) generate a value from a look-up table; (2) generate a ramp probability value; (3) use the value from the look-up table to select a single bit from the ramp probability value; and (4) use the selected bit from the ramp probability value to compute dither values. The software listing shown below performs these functions. Because the software listing below performs many of the functions of the block diagram of FIG. 3, where applicable the following detailed description of the software includes references to the components identified in FIG. 3. These references are meant merely to facilitate an understanding of the software and are not meant to limit the software in any way.

```
Void dither_logic 0
{
    int x_addr, y_addr;
    unsigned r_pat, g_pat, b_par
    unsigned r_dith,g_dith, b_dith;
    unsigned dith_val;
    unsigned r_inc, g_inc, b_inc
    if(dither_mode)
        // Determine position in look-up table (pattern_ram)
        y_addr=(y_pos + pattern_y_offset) & 0x07;
        x_addr=(x_pos + pattern_x_offset) & 0x07;
        // Get value to determine valid bit of probability ramp
        dith_val=(pattern_ram[y_addr].dw>>(x_addr<<2)) & 0x07;
        // 0 ≦dith_val ≦7
        // Generate probability ramp
        // Initially rdf, gdf & bdf contain the most significant unused bits
        // Finally they contain the probability ramp
        rdf=(power (2, rdf)) − 1;      //initially, 0≦rdf≦7;
        gdf=(power (2, gdf)) − 1;
        bdf=(power (2, bdf)) − 1;
        // finally, 0 ≦ rdf ≦ 127, i.e. rdf = 0, 3, 7, 15, 31, 63, 127;
        rdf is equal to one of these values
        // Use dither value to get weight from probability ramp
        r_inc = (rdf<<dith_val) & 0x01;
        g_inc = (gdf<<dith_val) & 0x01;
        b_inc = (bdf<<dith_val) & 0x01;
        // Weigh pixel accordingly
        switch (pixel_mode)
        case PIXEL_MODE_8BPP_TC:
            r_inc<<=5;
            g_inc<<=5;
            b_inc<<=6;
          break;
        case PIXEL_MODE_16BPP_565;
            r_inc<<=3;
            g_inc<<=2;
            b_inc<<=3;
          break;
        case PIXEL_MODE_16BPP_1555:
            r_inc<<=3;
            g_inc<<=3;
            b_inc<<=3;
          break;
        default;
        warning("rendr_id.c - Pixel mode not valid for dither %d/n",
        pixel_mode);
        break;
}
    // assign dither increment, checking for overflow
    r_dith = ((r_pe + r_inc) & 0x100)? r_pe: (r_pe + r_inc);
    g_dith = ((g_pe + g_inc) & 0x100)? g_pe: (g_pe + g_inc);
    b_dith = ((b_pe + b_inc) & 0x100)? b_pe: (b_pe + b_inc);
    // Set output pixel value
    r_pe = r_dith;
    g_pe = g_dith;
    b_pe = b_dith;
}
```

Figure 8:
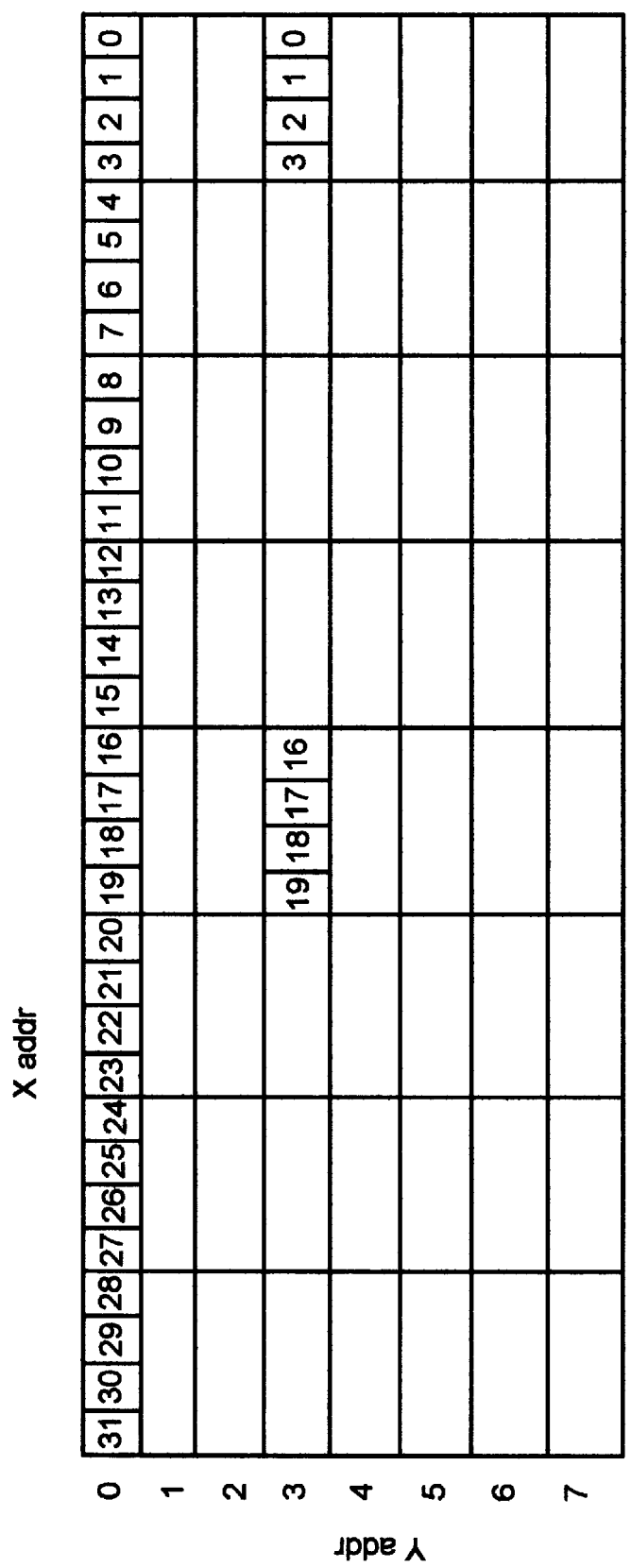
FIG. 8 shows bit positions in a look-up table constructed in accordance with the preferred embodiment.

The software listing assumes the values in look-up table 20 (FIG. 3) are organized in memory as eight double words in which each double word includes four bytes (32 bits) as shown in FIG. 8. Other look-up table configurations and sizes are equally permissible and are included within the scope of the invention. In a 32-bit double word there are eight 4-bit values and thus, in a look-up table with eight double words, there are 64 4-bit values.

In the following lines of the software listing, x and y input indices or addresses, x_addr and y_addr, are generated.

y_addr=(y_pos+pattern_y_offset)& 0x07;

x_addr=(x_pos+pattern_x_offset)& 0x07;

These input addresses are used to select one of the 64 4-bit values from the look-up table 20. The x and y input addresses are generated by adding the x and y pixel addresses (x_pos and y_pos) to offset values (pattern_y_offset and pattern_y_offset). Although the offset values are often 0, they may also include nonzero values, and are useful to generate various fonts. The resulting value is then logically ANDed with the hexidecimal value "07" (binary 0111) which functions to mask off all but the lower three bits of the sum of the pixel address and the offset. As three-bit values, x_addr and y_addr range from 0 to 7. Each y_addr value identifies a unique double word in the look-up table and each x_addr value identifies one of the eight 4-bit values in a double word. By way of example, x_addr equal to 4 and y_addr equal to 3 specifies the 4-bit value outlined in FIG. 8. These four bits represent bit values 16–19.

In the following line of the exemplary code listing, the output value, dith_val, from the look-up table is computed.

dith_val=(pattern_ram[y_addr].dw>>(x_addr<<2))& 0x07;

The output value, dith_val corresponds to the control signal on data lines 25 in FIG. 3. Dith_val is computed by performing a bit shift to the right by an appropriate number of bit positions so that the 4-bit value selected by x_addr and y_addr become the least significant four bits of the 32 bit double word (i.e., bits 0–3). In this line of code, the lookup table is represented by the array pattern_ram Because y_addr identifies one of the eight double words in the lookup table (i.e., pattern_ram), y_addr is used as an index to pattern_ram Thus, "pattern_ram[y_addr].dw" retrieves the particular double word indexed by y_addr. The x_addr value is bit shifted to the left by two bits, an operation that corresponds to multiplication by four. Dith_val is computed by bit shifting pattern_ram[y_addr].dwto the right (x_addr×4) times. The result is the positioning of the 4-bit value identified by x_addr and y_addr in the least significant four bits of the double word. Using the outlined value in FIG. 8 as an example, multiplying the x_addr value 4 by 4 results in a product of 16. Thus, the third double word in the 4-bit value (bit positions 19–16) are the bit shifted to the right by 16 bit positions and the selected 4-bit value becomes the least significant four bits (bits 0–3) shown in phantom outline in FIG. 8 after a right bit shift by 16 bit positions. The last step in this line of code is to AND the shifted double word with hexidecimal value 07 to mask off all but the least significant three bits.

The ramp probability values rdf, gdf, and bdf are calculated in following lines of code for red, green, and blue, respectively.

rdf=(power (2, rdf))-1; //rdf=$2^{rdf}$-1 gdf=(power (2, gdf))-1; //gdf=$2^{gdf}$-1 bdf=(power (2, bdf))-1; //bdf=$2^{bdf}$-1

In the first line of code above, the rdf ramp probability value to the left of the equal sign is calculated as $2^{rdf}$-1, where the rdf exponent is the FRAC value for the color red. The gdf and bdf values are similarly calculated in the second two lines, respectively, and gdf and bdf are the FRAC values for green and blue, respectively. In a 5-6-5 system, for example, rdf and bdf are 3-bit values and gdf is a 2-bit value. Table I below exemplifies the generation of the ramp probability value rdf. It is assumed in Table I that rdf is a three-bit FRAC value. The results in the table can be readily computed for FRAC values with a different number of bits.

TABLE I

Ramp Probability Values.

| Rdf | decimal | Binary |
|---|---|---|
| | $2^{rdf}-1$ | |
| 0 | 0 | 00000000 |
| 1 | 1 | 00000001 |
| 2 | 3 | 00000011 |
| 3 | 7 | 00000111 |
| 4 | 15 | 00001111 |
| 5 | 31 | 00011111 |
| 6 | 63 | 00111111 |
| 7 | 127 | 01111111 |

In the following lines of code, the dith_val value is used to select a single bit from the ramp probability values (rdf, gdf, bdf) to use in the dithering process.

r_inc=(rdf>>dith_val)& 0x01;

g_inc=(gdf>>dith_val)& 0x01;

b_inc=(bdf>>dith_val)& 0x01;

The r_inc, g_inc, and b_inc weight values are computed by right shifting the ramp probability values by a number of bits equivalent to dith_val and then ANDing the shifted value by 1 to mask off all but the least significant bit. Thus, if dith_val is 3, rdf is bit shifted to the right by three bits. Bit 3 becomes the least significant bit and is the only bit value retained after ANDing with 1. All other bits in the ramp probability value become logic 0 values after the AND operation. Thus, r_inc, zinc, and b_inc are either 0 or 1.

The r_inc, g_inc, and b_inc weight values are bit shifted to the left to provide an addend value in the following lines from the exemplary code listing.

```
Switch (pixel_mode)
{
    case PIXEL_MODE_8BPP_TC:
        r_inc<<=5;
        g_inc<<=5;
        b_inc<<6;
    break;
    case PIXEL_MODE_16BPP_565:
        r_inc<<=3;
        g_inc<<=2;
        b_inc<<=3;
    break;
    case PIXEL_MODE_16BPP_1555:
        r_inc<<=3;
        g_inc<<=3;
        b_inc<<=3;
    break;
    default;
        warning("rendr_id.c - Pixel mode not valid for dither %d/n",
        pixel_mode);
    break;
}
```

The number of bit positions shifted is determined by the pixel_mode which, in the in the portion of the code listing above, may be eight bits per pixel mode, sixteen bits per pixel mode in a 5-6-5 configuration or sixteen bits per pixel mode in a 1-5-5-5 configuration (five bits each for red, green, and blue, and one alpha bit). The left shift is necessary in the exemplary source listing to place the least significant of the weight values in a bit position corresponding to the least significant bit of a truncated color value. For example, in a 5-6-5 system, red is represented with the upper five bits (bits 3–7) of an eight bit color value Thus, r_inc must be bit shifted to the left by three bits (r_inc<<=3) to make r_inc compatible with 5-bit red color values.

The output dither value is produced by the following lines of code from the exemplary source listing.

```
r_dith = ((r_pe + r_inc) & 0x100)? r_pe: (r_pe + r_inc);
g_dith = ((g_pe + g_inc) & 0x100)? g_pe: (g_pe + g_inc);
b_dith = ((b_pe + b_inc) & 0x100)? b_pe: (b_pe + b_inc);
// Set output pixel value
r_pe = r_dith;
g_pe = g_dith;
b_pe = b_dith;
```

Taking red, for example (green and blue dither values are calculated the same way), r_pe represents the actual color value for red. To compute a dithered output value, r_inc is added to r_pe. As explained above with respect to FIG. 3, that summation may result in an overflow condition. In the first code line above, r_dith is set to the present actual color value r_pe (no dithering) if an overflow condition is detected upon adding r_inc to r_pe. If no overflow condition is present, then r_dith is computed as r_pe+r_inc. The overflow condition is detected by ANDing the summation of r_pe and r_inc with hexidecimal value 100 which masks off all bits other than the ninth bit (bit position 8). If that bit is a logic 1, ((r_pe+r_inc) & 0x100) will be true, thereby indicating an overflow condition. Finally, in the fifth line above. r_pe is set to the output r_dith value (r_pe=r_dith).

While preferred embodiments of the invention has been shown and described, modifications thereof can be made by one skilled in the art without departing from the spirit of the invention.

What is claimed is:

1. A method for dithering color in a graphics system that displays a group of pixels and wherein the color of the pixels is represented by color shades having fewer than eight bits, comprising the steps of:

(a) generating an eight bit color shade value for each pixel representing a desired color for each pixel;

(b) truncating the desired eight bit color shade value to obtain a truncated color shade value;

(c) generating a FRAC value for each pixel from the truncated bits of said eight bit color shade value;

(d) producing a rap value for each pixel using said FRAC vale, wherein said ramp value encodes a discrepancy between the desired eight bit color shade value and the truncated color shade value;

(e) mapping a dither value to a bit position within said ramp value; and (f) using a bit from said ramp value to select a color shade value of fewer than eight bits that determines the color of each pixel.

2. The method of claim 1, wherein said truncated bits in step (c) includes fewer than the two least significant bits of said desired eight bit color shade value.

3. The method of claim 2, wherein the truncated bits includes the three least significant bits of said desired eight bit color shade value.

4. The method of claim 2, wherein the step of using a bit from said ramp value to select a color shade value of fewer then eight bits (step e) includes using a value from a look-up table to select said bit from said ramp value.

5. The method of claim 4, wherein each pixel has an x address and a y address and said value from said look-up table is determined from the x address and the y address of the pixel to be rendered.

6. A method for dithering pixel color in a graphics system that displays a group of pixels in which primary pixel colors are represented by color shades having fewer than eight bits comprising the steps of:

(a) generating an eight bit color shade value for each pixel representing a desired color for each pixel;

(b) truncating the desired eight bit color shade value io produce a first color shade valve comprising fewer than eight bits;

(c) generating a FRAC value for each pixel representing the truncated bits of said desired eight bit color shade value;

(d) producing a ramp value for each pixel using said FRAC value, wherein said ramp value encodes a discrepancy between the desired eight bit color shade value and the first color shade value;

(e) producing an addend value for incrementing said first color shade value;

(f) incrementing said first color shade value by said addend value to produce a second color shade value;

(g) mapping a dither value to a bit position within said ramp value; and (h) selecting said first color shade value or said second color shade value to determine the color of each pixel in said group of pixels.

7. The method of claim 6, wherein said step of producing a ramp value (step d) includes producing a ramp value that includes a number of logic one values indicative of said discrepancy between the desired eight bit color shade value and the first color shade value.

8. The method of claim 6, wherein said step of selecting said first color shade value or said second color shade value (step g) is performed in response to the state of a bit from said ramp value.

9. The method of claim 8, wherein each pixel has an x address and a y address and said x address and said y address of a pixel to be rendered are used to obtain a value from a look-up table, said look-up table value used to select said bit from said ramp value.

10. The method of claim 6, wherein said step of incrementing said first color shade (step f) produces on overflow signal if an overflow condition is present.

11. The method of claim 10, wherein said step of selecting said first color shade value or said second color shade value (step g) is performed in response to said overflow signal.

12. A graphics system that displays color shades based upon binary representation having fewer than eight bits, wherein said graphics system initially receives a desired eight bit binary representation for each color shade that is used by the graphics system to render pixels in a pixel grid, said desired eight bit binary representation including upper order bits and lower order bits, comprising:

select fractional logic that receives the desired eight bit binary representation and wherein said select fractional logic produces on its output lines the lower order bits of said desired eight bit binary representation value;

a look-up table that produces a control value based upon an address of each pixel; and ramp probability logic coupled to said select factional logic, said ramp probability logic producing a ramp value that encodes a discrepancy between said desired eight bit binary representation and said binary representations having fewer than eight bits and mapping logic coupled to said look-up table and ramp probability logic, said mapping logic mapping a look-up table value to a bit position within said ramp value.

13. The graphics system of claim 12, further including an addend generator that produces an addend value for incrementing said binary representations having fewer than eight bits.

14. The graphics system of claim 13, further including add logic for producing the sum of said addend value and said binary representations having fewer than eight bits.

15. The graphics system of claim 14, further including a first multiplexer for selecting a bit from said RAMP value, and wherein the bit selection is controlled by said control value produced from said look-up table.

16. The graphics system of claim 15, further including a second multiplexer to which said binary representation having fewer than eight bits and said sum are provided as input signals, and wherein said second multiplexer selects one of a said input signals, said input signal selection controlled by a control signal and said control signal determined by said ramp value.

17. The graphics system of claim 12, wherein said ramp value includes a number of logic 1 values indicative of the discrepancy between said desired eight bit binary representation and said binary representations having fewer than eight bits.

18. The graphics system of claim 17, wherein said graphics system represents color using five bits for red and five bits for blue.

19. The graphics system of claim 18, wherein said graphics system represents color using six bits for green.

20. The graphics system of claim 15, wherein said add logic produces an overflow output signal upon detection of an overflow condition.

21. The graphics system of claim 20, wherein said control signal is also determined by said overflow signal.

22. A computer readable storage medium for storing an executable set of software instructions which, when inserted into a host computer system, is capable of controlling the operation of the host computer, said software instructions being operable to dither pixel colors in a graphics system and wherein the color of the pixels is represented by color values having fewer than eight bits, said software instructions including:
   means for determining a first index value to a look-up table;
   means for providing a look-up table value from said look-up table based on said first index value;
   means for determining a ramp probability value;
   means for mapping said look-up table value to a bit position within said ramp probability value; and
   means for selecting a dither color value in said graphics system.

23. The invention of claim 22 further including a second index value and wherein said look-up table value is based on said first and said second index values.

24. The invention of claim 23 wherein each pixel on said screen includes a pixel address and said first and said second index values are based on pixel addresses.

25. The invention of claim 24 wherein said pixel addresses comprise a plurality of higher order bits and lower order bits, the lower order bits determining said first and said second index values.

26. The invention of claim 25 wherein the lower order bits used to determine said index values include the least significant three bits of said pixel address.

27. The invention of claim 26 wherein said least significant three bits are obtained by ANDing said pixel address with a value of 7.

28. The invention of claim 27 wherein said pixel address is added to an offset value before ANDing with 7.

29. The invention of claim 28 wherein said look-up table comprises a plurality of rows of binary values, each binary value comprising a plurality of bits wherein said first index value is used to select a row from said look-up table, and wherein said look-up table value is determined by bit shifting said second index value by two bit positions to the left to produce a first bit shifted value and bit shifting said selected row to the right by a number of bit positions equal to said first bit shifted value thereby producing a second bit shifted value.

30. The invention of claim 29 wherein said look-up table value is further determined by selecting the least significant three bits of said second bit shifted value.

31. The invention of claim 30 wherein said color values having fewer than eight bits are generated by truncating eight bit color values and wherein said ramp probability value is determined by computing $2^{FRAC-1}$ where FRAC is generated from the truncated bits of said eight bit color values.

32. The invention of claim 31 wherein said dither color value is determined by right bit shifting said ramp probability value by a number of bit positions equal to said look-up table value and then selecting the least significant bit of said bit shifted ramp probability value and setting all other bits in said ramp probability value to zero.

33. The invention of claim 32 wherein said bit shifted ramp probability value is left bit shifted to provide an addend value for dithering.

34. The invention of claim 33 wherein said dither value is further determined by adding said addend value to a color value.

35. The invention of claim 34 wherein said added value is added to a color value and if an overflow condition results from said addition, said dither value is set to equal said color value.

36. A method for dithering color in a graphics system that displays a group of pixels on a screen, wherein the color of the pixels is represented by color values having fewer than eight bits, said method comprising:
   determining a first index value to a look-up table;
   determining a look-up table value from said look-up table based on said first index value;
   determining a ramp probability value that encodes a discrepancy between an eight-bit color value and a color value having fewer than eight bits;
   mapping said look-up table value to a bit position within the ramp probability value; and
   using a value stored in said bit position determine a dither color value in said graphics system.

37. The method of claim 36 further determining a second index value and wherein said look-up table value is also based on said first and said second index values.

38. The method of claim 37 wherein each pixel on said screen includes a pixel address and said first and said second index values are determined based on pixel addresses.

39. The method of claim 38 wherein said pixel addresses comprise a plurality of higher order bits and lower order bits, the lower order bits determining said first and said second index values.

40. The method of claim 39 wherein the lower order bits used to determine said index values include the least significant three bits of said pixel address.

41. The method of claim 40 wherein said least significant three bits are obtained by ANDing said pixel address with a value of 7.

42. The method of claim 41 wherein said pixel address is added to an offset value before ANDing with 7.

43. The method of claim 42 wherein said look-up table comprises a plurality of rows of binary values, each binary value comprising a plurality of bits wherein said first index value is used to select a row from said look-up table, and wherein said look-up table value is determined by bit shifting said second index value by two bit positions to the left to produce a first bit shifted value and bit shifting said selected row to the right by a number of bit positions equal to said first bit shifted value thereby producing a second bit shifted value.

44. The method of claim 43 wherein said look-up table value is further determined by selecting the least significant three bits of said second bit shifted value.

45. The method of claim 44 wherein said color values having fewer than eight bits are generated by truncating eight bit color values and wherein said ramp probability value is determined by computing $2^{FRAC-1}$ where FRAC is generated from the truncated bits of said eight bit color values.

46. The method of claim 45 wherein said dither color value is determined by right bit shifting said ramp probability value by a number of bit positions equal to said look-up table value and then selecting the least significant bit of said bit shifted ramp probability value and setting all other bits in said ramp probability value to zero.

47. The method of claim 46 wherein said bit shifted ramp probability value is left bit shifted to provide an addend value for dithering.

48. The method of claim 47 wherein said dither value is further determined by adding said addend value to a color value.

49. The method of claim 48 wherein said added value is added to a color value and if an overflow condition results from said addition, said dither value is set to equal said color value.

* * * * *